INVENTOR
CARLO VIA,
BY *Stone, Boyden & Mack*
ATTORNEYS.

Feb. 19, 1957  C. VIA  2,781,990
DOUBLE ACTING RESILIENT SUPPORT FOR ENGINE MOUNTINGS
Filed Oct. 22, 1953  2 Sheets-Sheet 1

INVENTOR
CARLO VIA,
BY *Stone, Boyden & Mack*
ATTORNEYS.

United States Patent Office 2,781,990
Patented Feb. 19, 1957

2,781,990

DOUBLE ACTING RESILIENT SUPPORT FOR ENGINE MOUNTINGS

Carlo Via, Milan, Italy, assignor to Societa Applicazioni Gomma Antivibranti S. A. G. A. Societa per Azioni, Milan, Italy Application October 22, 1953, Serial No. 387,650

Claims priority, application Italy November 19, 1952

4 Claims. (Cl. 248—9)

This invention pertains to resilient supports for mobile or stationary engines and machines, and more particularly has reference to double-acting supports, having great flexibility as regards the supported static load, and also a high ratio of axial-radial flexibility.

The invention herein disclosed is an improvement on a resilient support disclosed in my Italian Patent No. 6,547, granted May 31, 1951, and this application corresponds with my Italian application No. 14,334, filed November 19, 1952.

An object of this invention is to provide an improved, double-acting, resilient support, having a progressively acting, elastic, counter-recoil, buffer element which is symmetric with, and essentially a reciprocal duplicate of, the main elastic element directly supporting the imposed load.

Another object is to provide such a support, in which the coacting rigid and elastic elements are so constructed and arranged that, when subject to increasing load, each elastic element is first strained in flexion, and then progressively in compression, in an analogous manner as said load increases. That is to say, the load/deformation ratio curve of the buffer element is a reversed analogue of the corresponding curve of the main elastic element. In this manner, the composite load/deformation ratio curve of the whole support is symmetric about a selected condition of load, and its behavior is analogous in both recoil and counter-recoil directions.

Another object of this invention is to provide an improved, double-acting resilient support in which the main and buffer elastic elements are coupled in parallel, so that the whole support has the highest axial resiliency in the line of application of the supported load, and a radial flexibility equal to half its axial flexibility. Also, by suitably contouring the coacting surfaces of the rigid and elastic elements of the support, the ratio between its axial and radial flexibilities can be varied within the greatest limits.

With these and other objects in view, which may be incident to my improvements, my invention consists in the combination and arrangement of elements hereinafter described and illustrated in the accompanying drawings, in which.

In all figures of the drawings, the corresponding elements are denoted by the same reference numerals.

Figure 1:
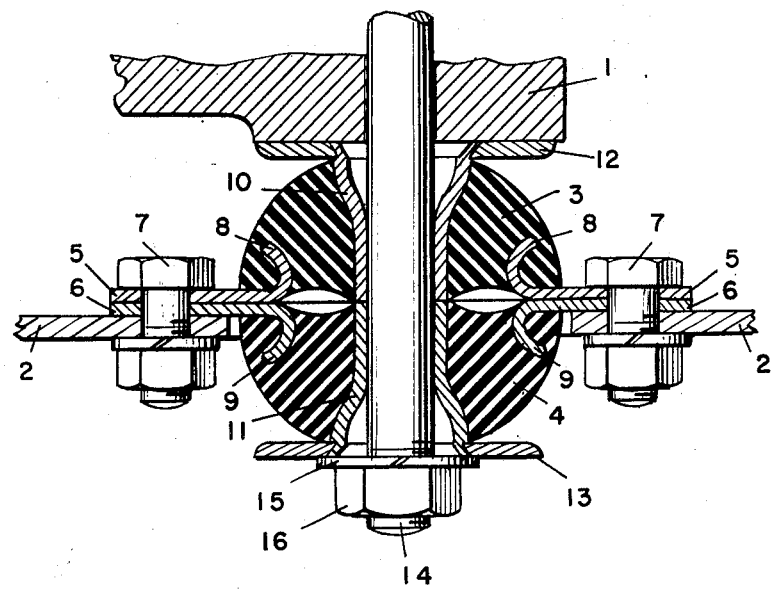
Figure 1 shows, in vertical section, one embodiment of my invention.

Referring first to Figure 1, the reference numeral 1 denotes an engine or machine which is supported by a fixed frame 2, by means of a pair of identical, hemispherical elastic elements 3 and 4. A pair of identical, rigid, annular plates 5 and 6 are secured to frame 2, by a plurality of bolts 7. Plates 5 and 6 have identical contoured flanges 8 and 9 which are curved in opposite directions and embedded in elastic elements 3 and 4 respectively, said flanges cooperating to provide an annular ring presenting a curved surface convex with respect to the sleeves 10 and 11. A pair of identical, flared, rigid, tubular sleeves 10 and 11 extend through the centers of elastic elements 3 and 4, respectively, and are attached thereto by vulcanization. A pair of identical rigid, annular, discs 12 and 13 are affixed to the flared ends of sleeves 10 and 11 respectively to provide annular flat working faces directed toward the space between the flanges 8, 9 and the sleeves 10, 11, and said sleeves are slidably mounted upon a bolt 14 which is attached at its upper end to the supported machine 1, and is provided at its lower end with a washer 15 and threaded nut 16, by which sleeves 10 and 11 are adjustably clamped to machine 1. Before assembly on bolt 14, the overall height of elastic elements 3 and 4 is greater than the combined length of sleeves 10 and 11, so that said elastic elements may be compressed to a selected extent, by the tightening of nut 16 on bolt 14, and thereby adjust the lateral flexibility of said elastic elements as desired. Elastic elements 3 and 4 have shallow grooves in their abutting surfaces which provide a space for the deformation of said elements under load, which increases their axial flexibility.

When assembled as shown in Figure 1, the supported load deforms the main elastic element 3, and brings it progressively into contact with an increasing area of disc 12, as the load increases. This causes a correspondingly increasing radial expansion of said element, with increasing load. As elastic element 3 is radially expanded it is increasingly stressed in flexion, and then, as sleeve 10 is further displaced downwardly with increasing load, elastic element 3 is increasingly stressed in compression, between the contoured surfaces of the flared portion of sleeve 10 and the curved flange 8, which causes a progressive stiffening of the support as the load is increased.

From the foregoing, it is clear that, as the load on the support is increased, elastic element 3 is first stressed in flexion and then subsequently in compression. Accordingly, by suitably contouring the flared portion of sleeve 10 and the curved flange 8, the point at which the stress in elastic element 3 changes from flexion to compression may be made to coincide with the dead load imposed on the support, i. e. the static weight of the supported machine. When this is done, the static load is supported during that part of the loading in which the support reacts with its greatest resiliency, while any increase in loading (due to live load) is resisted by the support with progressively decreasing resiliency (i. e. increasing stiffness).

Figure 2:
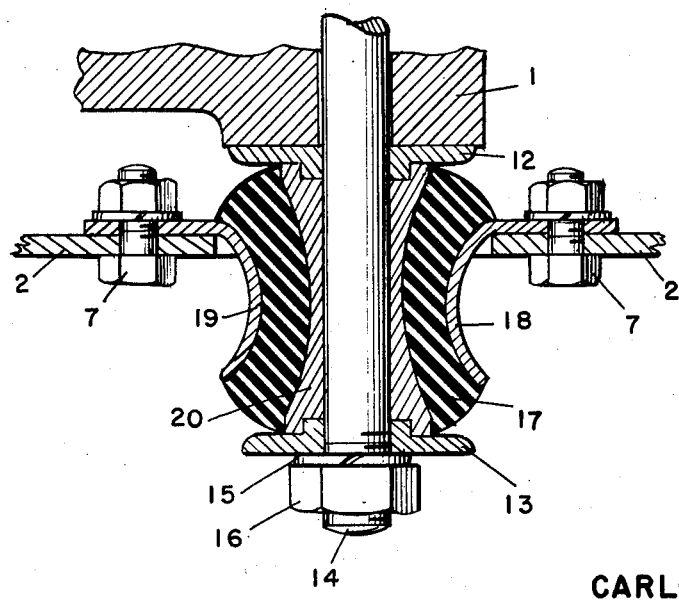
Figure 2 is a similar view of a modified form of the resilient support shown in Figure 1.

From the reciprocally opposite arrangement of elastic elements 3 and 4, as shown in Figure 2, it is seen that, as elastic element 3 is stressed in compression, by the downward displacement of sleeve 10 under load, elastic element 4 is stressed in tension.

This serves only to reduce the initial compression in element 4, which adds nothing to the load-opposing resistance of the support. If the load is increased beyond the point where the tensile stresses in elastic element 4 equal the initial compressive stresses therein, the increase in tensile stresses will add slightly to the load-opposing resistance of the support. It is also clear from the reciprocally opposite arrangement of elastic elements 3 and 4 that, when sleeve 11 is displaced in an upward direction, as during rebound (counter-recoil) from a sudden excessive live load, elastic element 4 is deformed and stressed in exactly the same manner, as is elastic element 3, when sleeve 10 is displaced downwardly under load. And since elastic elements 3 and 4, and rigid elements 8, 9 and 10, 11 are identical in design, the load/deformation ratio curve of element 4, during rebound will be an analogue of the load/deformation ratio curve of element 3 during direct loading.

Finally, since the vertical displacement of the load 1, relative to frame 2, in either direction is opposed substantially by only one of the elastic elements 3 or 4, while both of said elements equally oppose any lateral displacement of load 1 (relative to frame 2), it is apparent that the radial (lateral) flexibility of the support is only one half of its axial (vertical) flexibility. It is also clear that the ratio between the axial and radial flexibility of the support can be varied within wide limits to suitably varying the relative height and width of elastic elements 3 and 4, and the spacing and contours of rigid elements 8, 9 and 10, 11.

Figure 2 shows a modification of the support shown in Figure 1, in which a single elastic element 17 replaces elements 3 and 4 of Figure 1; a single annular plate 18, having a downwardly extended flange 19, replaces plates 5 and 6 of Figure 1; and a single tubular sleeve 20 replaces sleeve 10 and 11 of Figure 1.

Since the attachment of flange 19 to frame 2 is not in the middle of the support as in Figure 1, the modification shown in Figure 2 reduces the working space between the supported load 1 and the supporting frame 2. Similarly, by reversing the position of plate 2, so that flange 19 is above instead of below frame 2, the working space below the frame may be likewise reduced by using the modification of Figure 2.

Also, since in Figure 2, one elastic element 17 replaces two such elements 3 and 4 of Figure 1, and one annular plate 18 replaces two such plates 5 and 6 of Figure 1, the modification shown in Figure 2 is simpler and lighter in construction than that of Figure 1, and the continuity of the single curved surface of flange 19 produces a greater constancy in the axial and radial load/deformation ratio curves of elastic element 17, as compared to those of elements 3 and 4 of Figure 1.

Figure 3:
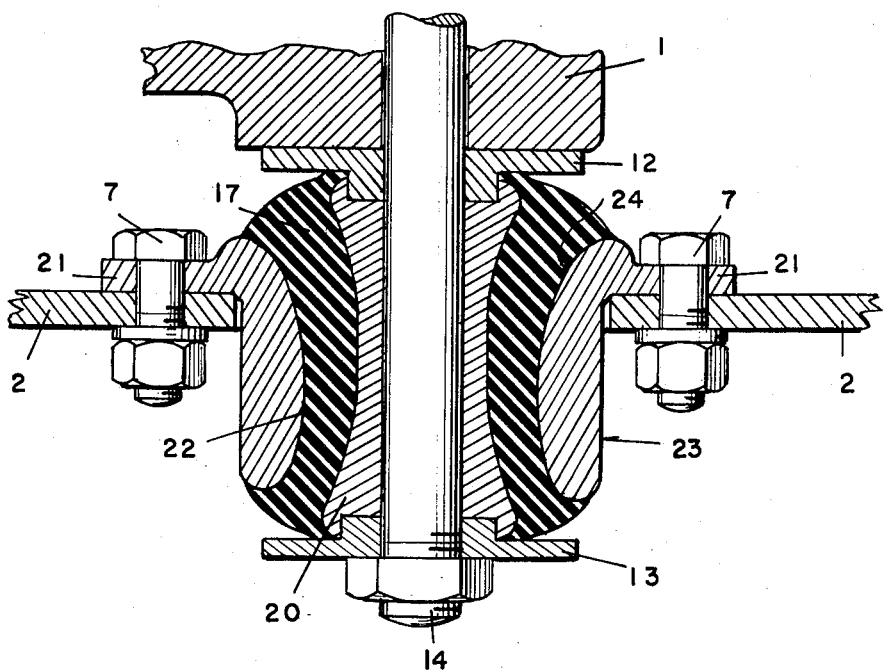
Figure 3 is a similar view of another modified form of the resilient support shown in Figure 1.

In Figure 3, there is shown a slight modification of the form of support shown in Figure 2, which consists of substituting, for the annular plate, 18 having a curved flange 19 of Figure 2, an annular plate 21 having an integral sleeve 22 whose outer surface 23 is cylindrical and whose inner surface 24 is contoured similarly to the curved flange 19 of Figure 2. The cylindrical outer surface 23 of sleeve 22 permits adjustment of the support in suitable seats. Since sleeve 22 is thicker and sturdier in construction that the flange 19 of Figure 2, the former can be made of lighter weight metal, as for example aluminum. Alternatively, the support of Figure 3 can be made either with all of its rigid parts of light alloy metal, or of steel, or with some rigid parts of light alloy metal and other parts of steel, as desired.

It will be noted that, in all of the embodiments of the invention here illustrated, the minimum inner diameter of the outer member, such as flange 19, Fig. 2, is greater than the maximum outer diameter of the inner tubular structure, such as tube 20, Fig. 2, and that the ends of the elastic structure are generally spherical, curving away from the flat working faces of elements 12, 13 toward the ends of the outer member.

While I have shown and described the preferred embodiments of my invention, I desire it to be understood that I do not limit myself to the precise details of construction disclosed by way of illustration, as these may be changed and modified by those skilled in the art without departing from the spirit of my invention nor exceeding the scope of the appended claims.

I claim:

1. In a double acting resilient support, the combination of a central rigid tubular structure the exterior surface of which flares outwardly at each end, a pair of members secured each to a different end of said tubular structure and extending transversely therefrom to provide flat working surfaces surrounding the ends of said tubular structure, said tubular structure being adapted to receive a mounting bolt for securing such structure to a device to be mounted by the support, a flat mounting plate structure disposed in a plane transverse to said tubular structure and intermediate of the outwardly flared ends thereof, said mounting plate structure being provided with an opening disposed coaxially with respect to said tubular structure and defined by an annular flange the inner surface of which is generally arcuate in cross-section and convex with respect to said tubular structure, the inner diameter of said opening being greater than the maximum outer diameter of the flared ends of said tubular structure, and an annular elastic structure dipsosed between and bonded to said flange and said tubular structure and extending for substantially the entire length of said tubular structure so as to terminate adjacent said flat working surfaces, the end surfaces of said elastic structure each being a segment of a sphere and curving away from the corresponding one of said flat working surfaces toward said flange, whereby increasing axial loads applied in either direction cause a portion only of said elastic structure to be stressed first primarily in flexion and then primarily in compression.

2. In a double-acting resilient support, the combination of a pair of rigid tubular members disposed end-to-end in coaxial alignment, said tubular members presenting exterior surfaces which flare outwardly at the free ends of the tubular members, a pair of generally hemispherical elastic members arranged base-to-base and each having a bore perpendicular to its base and embracing a different one of said tubular members, said elastic members being bonded to said tubular members, a pair of flat mounting plates superposed one on the other to form a mounting plate structure lying in the plane defined by the bases of said elastic elements, each of said plates having an opening disposed concentrically with said tubular members and defined by an annular flange of generally arcuate cross-section, said flanges being of equal diameter and extending away from each other and cooperating to provide an annular ring presenting a generally convex surface facing said tubular members, said flanges each being embedded in a different one of said elastic members and bonded thereto, and a pair of members each secured to the flared end of a different one of said tubular members and extending transversely thereof to provide a flat working surface surornding such flared end and facing the corresponding one of said elastic elements, the inner diameter of said ring being greater than the maximum outer diameter of the flared ends of said tubular members, and said rubber members extending for the entire length of said tubular members.

3. In a double acting resilient support, the combination of a rigid tubular member the outer surface of which curves from a medial portion of smaller diameter to end portions of larger diameter, a mounting plate disposed transversely of said tubular member and provided with an opening defined by an annular flange concentric with respect to said tubular member and disposed intermediate the ends of such member, said flange having an axially curved surface convex with respect to said tubular member, the minimum inner diameter of said flange being greater than the maximum outer diameter of said tubular member, an annular elastic disposed between and bonded to said flange and tubular member and extending for the entire length of the latter, and a pair of rigid members secured each to a different end of said tubular member and extending transversely thereof to provide flat working surfaces surrounding said ends and facing said elastic member, the ends of said elastic member being a segment of a sphere and curving away from said working surfaces toward said flange.

4. In a double-acting resilient support, the combination of a central rigid tubular member the outer surface of which curves from a medial portion of smaller diameter to flared end portions of larger diameter, an outer tubular member disposed concentrically about said central member, said outer member being shorter than said central member and having an outer cylindrical surface and an inner longitudinally curving surface, the latter being convex with respect to said central member, the minimum inner diameter of said outer member being greater than the maximum outer diameter of said central member, an annular elastic element disposed between and bonded to said central and outer members and extending for the entire length of said central member, a pair of end members each secured to a different end of said central member and extending transversely thereof to provide flat working faces directed toward the annular space between said central and outer members, the end surfaces of said elastic element being a segment of a sphere and curving away from said working faces toward the ends of said outer tubular member, and a mounting plate extending transversely outwardly of said outer member and rigidly connected thereto.

References Cited in the file of this patent

UNITED STATES PATENTS

| | | |
|---|---|---|
| 2,460,586 | Keetch | Feb. 1, 1949 |

FOREIGN PATENTS

| | | |
|---|---|---|
| 466,354 | Great Britain | May 26, 1937 |
| 548,149 | Great Britain | Sept. 28, 1943 |
| 571,026 | Great Britain | Aug. 2, 1945 |
| 667,232 | Great Britain | Feb. 27, 1952 |